United States Patent Office 2,976,159
Patented Mar. 21, 1961

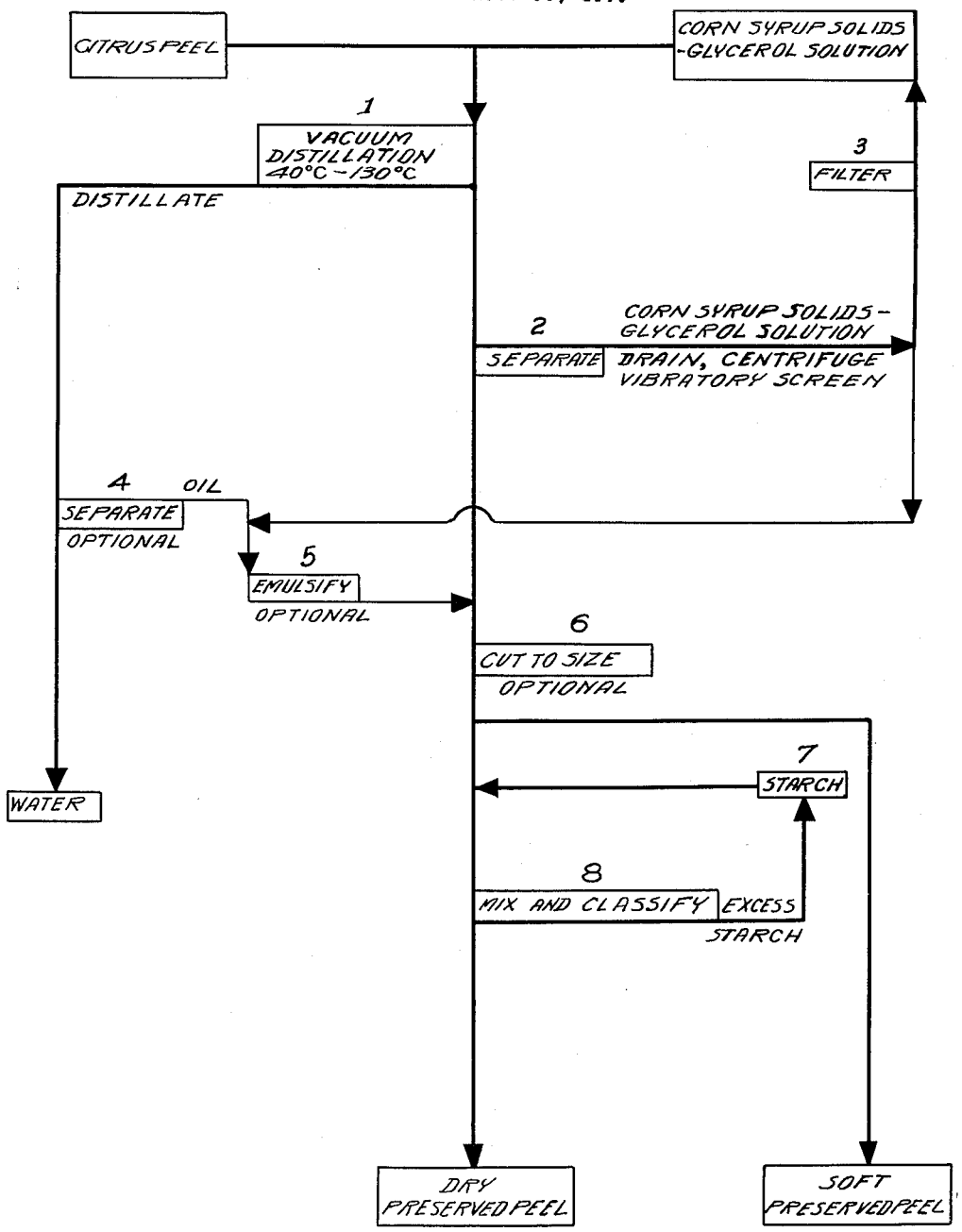

2,976,159

FIBROUS FRUIT PRODUCT AND PROCESS

Horton E. Swisher, Upland, Calif., assignor to Sunkist Growers, Inc., Los Angeles, Calif., a corporation of California Filed Nov. 30, 1959, Ser. No. 856,301

37 Claims. (Cl. 99—204)

This invention is concerned with a substantially dehydrated, readily rehydratable, glycerol-corn syrup solids containing fibrous fruit product, and to a process for preserving fibrous fruits in a condition approximating their natural state. More specifically, my invention relates to a process for preserving citrus peel, pomes, coconut meat, cranberries, pineapples and other fibrous, firm fruit substances and to the resulting preserved product. This application is a continuation-in-part of my copending application Serial No. 660,422, filed May 20, 1957, now abandoned.

While my invention is equally well adapted to the preservation of any of the foregoing fruit substances, it will be disclosed with particular reference to the problems of citrus peel preservation since preserved citrus peel as currently available has flavor and storability characteristics which are far from satisfactory.

Citrus peel is presently available only in the form of cups or half shells packed in barrels containing sulfited brine or as a finished product in the form of candied or glacéd peel. The brine packed peel is not a commercially desirable material because it requires thorough washing and draining preparatory to use and because the waste weight transportation cost is sufficiently great to discourage extensive use. Furthermore, sulfited brined peel, after washing, retains little essential oil flavor, is bleached in appearance, and hence bears little resemblance to fresh peel.

On the other hand, preparation of candied citrus peel has traditionally required, and still requires, an expensive, time consuming process involving repeated boiling of leached peel in sugar solutions of varying degrees Brix. Such processing results in a material diminution of natural essential oil flavor and destroys the citrus character of the peel. As a result, the product finds limited use primarily as a decorative agent in fruit and pound cakes where other materials provide the flavor.

The same objections exist whether the product is prepared by boiling in an aqueous sugar solution, or, as has been proposed, by heating citrus peel slowly in the presence of solid sugars. In the latter event, the citrus peel cannot, because of its browning tendency, be heated to a temperature high enough to remove sufficient moisture to give a product having a satisfactory storage life.

With reference to the other firm, fibrous fruit substances of my invention, it should be noted that no process has been developed which will permit their true fresh flavor retention with long storage. In addition, some of these fruit substances have never been utilized in a preserved form. For example, pineapple segments taken from the core of the fruit may be treated in accordance with my invention thus producing a worthwhile food commodity from a heretofore wasted portion of the fruit.

It is therefore an object of my invention to prepare a firm, fibrous fruit product which may be stored for long periods of time without deterioration or appreciable loss of volatile flavoring constituents; which may be rehydrated to fresh form prior to consumption; which has a minimum amount of absorbed sweetening or other agent; which may be prepared easily and cheaply; and which may be readily transported and stored, even under adverse conditions, without deterioration.

A further object of the present invention is to provide a process for the preservation of the peel of citrus fruits, either the entire peel or selected portions thereof, the process including a step permitting the peel oil content of the product to be controlled within wide limits and leading to a product of improved translucency.

Another object of this invention is to provide a process for the production of a novel carrier for food flavors, comprising the preserved albedo portion of the citrus peel.

Still another object of this invention is to provide a novel food flavoring composition comprising a carrier prepared from citrus albedo in which the natural food flavor is "locked-in" and preserved in such form for long storage periods.

The details of my invention will be more readily apparent from a consideration of the drawing which is a flow sheet of my process as related specifically to the treatment of citrus peel.

The citrus peel constituting the basic preferred raw material of my process, which is available in the form of cups or half shells as a result of the juice extracting operations of a citrus plant, may be utilized in this form or diced, shaved or otherwise subdivided, with a minimum degree of oil gland rupture, to the size desired. I have found that it is important for many product applications that the oil pores of the peel remain intact to as great an extent as possible. If they are ruptured by subjecting the peel to grinding or some equally harsh process, the volatile essential oil, which is primarily responsible for the taste of the peel, is lost to the product.

On the other hand, for some product applications less than the full flavor complement of the citrus oil in the peel is desirable. A feature of the present invention resides in the discovery that a dehydrated citrus peel product having variable and controllable levels of peel oil flavor can be produced by selective rupturing or destruction of the peel oil cells prior to the dehydration and syrup impregnation process. Although any process of abrading or shaving off a portion of the peel flavedo will remove some of the oil cells and thus lower the over-all flavor level, I have found that the purpose is accomplished most effectively by pin-point pricking the peel on the flavedo side, thereby rupturing a portion of the oil cells and liberating the oil therefrom. Thus, the amount of peel oil in the final product is readily controlled by varying the extent to which the pricking or puncturing is carried out, i.e., the number of pricks or punctures per unit surface area of flavedo.

I have further found that the pricking operation results in more effective impregnation (syrup uptake) and also produces a final product of improved translucency. Additionally, the liberated oil can be recovered by known methods as a valuable by-product.

The step of pricking the flavedo can be carried out on the whole fruit or on the peel after removal of the fruit, such as the peel remaining from juicing operations. A preferred production pricking method comprises the use of an apparatus of the type shown in Figure 19 of U.S. Patent No. 2,212,066. In this case the pricking operation is carried out simultaneously with the juicing operation.

The valuable essential oil that is squeezed out or released from the oil sacs by the pricking operation is recoverable by conventional means such as water-washing, wiping, absorbing or solvent extracting.

The present invention further comprehends within its scope the preservation treatment of the albedo or "white" portion of citrus fruits to produce a carrier for natural food flavors of fruits, vegetables, meats, etc. I have discovered that the citrus albedo is admirably suitable for such a purpose in that, with the exception of grapefruit, it is neutral in flavor character and can thus be used successfully with many flavors. Grapefruit albedo is bitter when eaten alone, but it can impart a desirable flavor to many products when its flavor is diluted by its addition to such other products. Moreover, controlled bitterness in food products is highly desirable for a complete balance of the taste elements. Accordingly, grapefruit albedo is considered an important raw material source in carrying out the present invention.

All types of citrus albedo are desirable flavor carriers due to their softness, sponge-like absorbing characteristics and their ability to remain as individual pieces during processing. Citrus albedo is unique among all natural food products in possessing these desirable characteristics as a natural food flavor carrier. Furthermore, recent citrus peel analyses indicate that the albedo is an excellent source of vitamins and minerals. Its vitamin content includes ascorbic acid, niacin, panthothenic acid, thiamin, riboflavin and folic acid. Among the minerals are calcium, iron, magnesium, potassium, phosphorous and sulfur.

In order to use citrus peel as a flavor carrier for various food flavors, it is necessary to completely remove the flavedo which contains the essential oil-bearing sacs. The resulting albedo is then cut mechanically in pieces of the desired sizes. For bite-size pieces, the albedo is desirably cut into small cubes. The preservation of the albedo is carried out essentially in the same manner as described below in connection with citrus peel.

The corn syrup solids-glycerol solution, which is utilized as a heat exchange medium and as an impregnating agent, consists of not more than 40% nor less than 15% by weight of corn syrup solids and not more than 85% nor less than 30% of glycerol. In addition, I have found that dextrose monohydrate may be incorporated in the solution in amounts not exceeding 40% by weight of the solution. Greater percentages of dextrose monohydrate in the solution result in the crystallization of the impregnated peel upon storage, thus defeating the objective of oxidation protection of the peel. I prefer to utilize either a solution having a 60% glycerol and 40% corn syrup solids content or if economic considerations are governing, a solution having 40% glycerol, 20% corn syrup solids and 40% dextrose monohydrate.

The foregoing percentage limits are important in obtaining a non-crystalline amorphous product. They are important in view of the fact that excessive viscosity of the liquid at the temperature required for removal of water from the peel results in localized overheating, oxidation and browning reactions. Excessive temperatures cause rupture of the peel cells, oxidation of the essential oil, browning of the peel and consequent loss of natural flavor upon rehydration.

On the other hand, while amounts of glycerol in excess of 85% of the total solution satisfactorily permit dehydration of the peel to the requisite moisture level, a peel dehydrated in a mixture containing less than 15% of corn syrup solids contains insufficient solid amorphous material when cooled to prevent loss of the volatile essential oils and deterioration with storage.

Propylene glycol may be utilized as a substitute for a portion of the glycerol since it serves the same purpose and functions in the same manner. However, if propylene glycol is used it should not exceed 20% by weight of the total solution since it has an undesirable slightly acrid taste.

I have found that molten corn syrup solids or a corn syrup solids-corn syrup solution cannot be used alone in the treatment of citrus peel to obtain a product having a natural flavor and a long storage life. I have further found that glycerol is an ideal material for use in my process in view of its practical nonvolatility at the temperature of processing, its viscosity reducing characteristics, its solvent ability for corn syrup solids, its chemical stability, its noncrystallinity, its immiscibility with citrus and other essential oils, its peel softening or conditioning ability, its substantial absence of taste or odor and the fact that it is a good heat exchange medium. Although, as a practical matter, the ratio of the corn syrup solids-glycerol solution to the citrus peel should be one or more by weight, I prefer to use a ratio of 3:1 or 4:1 in order to obtain a greater ease of manipulation during processing. The corn syrup solids-glycerol solution is an edible non-aqueous heat exchange liquid which permits the hydro-distillation of moisture from peel with a minimum loss of essential oil and a minimum change in character of the other constituents of the peel.

As evident from the flow sheet, the first step of my process after adding citrus peel to the hot corn syrup solids-glycerol solution is the vacuum hydro-distillation, at a temperature of from 40° C. to 130° C., of the resulting peel-glycerol mixture. Since the fragrance and taste of a peel product are functions of the remaining unreacted oil content of the peel, it is essential in the preparation of such a product not to disturb the content or character of the volatile oil. On the other hand, it is necessary to substantially dehydrate the peel in order to prevent its rapid bacterial, enzymatic and chemical deterioration.

Nothwithstanding that moisture removal processes are conducive to peel oil reaction and removal, I have found it possible to dehydrate peel without affecting peel desirability by the vacuum hydro-distillation of the peel containing corn syrup solids-glycerol solution. Contrary to expectations, loss of oil released from the peel cells, is less under vacuum than it is under atmospheric pressure. This factor, as well as the reduced rates of reaction of essential oils at reduced time-temperatures, permits preparation of a superior product when vacuum distillation is used.

The distillation is carried on a sufficient length of time to reduce the moisture content of the peel to a maximum of 16% and preferably to a moisture content of not over 8%. I have found that peel having a moisture content of more than 16% has a progressively reduced resistance to enzymatic degradation, the growth of microorganisms, and browning reactions. However, while a product having less than 16% moisture will have an improved storage life, it is most desirable, from the standpoint of length of storage life and fresh flavor rehydratability, to continue distillation until a moisture level of below 8% has been achieved.

I have further found that a translucent peel product may be prepared, if desired, by sudden release of the vacuum several times shortly prior to termination of the distillation step. The rapid increase in external pressure results in impregnation of peel pores with the glycerol-corn syrup solids mixture, thus changing the refractive index of the citrus albedo.

After the distillation step has been completed, it is necessary to separate the dehydrated, impregnated, citrus peel from the corn syrup solids-glycerol solution. This may be accomplished by simply draining the distilland through a screen, by centrifugation, by vibratory screening or by any other suitable means. The corn syrup solids-glycerol liquid resulting from separation step 2 is filtered to remove bits of peel and detritus as shown in step 3 and returned to the supply material.

The distillate from the vacuum distillation step is essentially water, although it may contain that portion of the essential oil released from the oil glands of the peel which were ruptured during initial cutting to size. Since the percentage of volatile oil found in the distillate is related to the method of sizing and the degree of subdivision of the citrus peel prior to distillation, and since retention of essential oil within the peel glands is essential to maintenance of flavor, taste and scent during long storage, I prefer to prepare the peel with a minimum of disturbance of the oil glands by shaving, cutting or dicing to a size preferably not smaller than ¼ inch, even though the final product is to be 20 or 30 mesh size. If the peel is sized in this manner it will not be worthwhile to undertake the optional step of separating the oil from the water in the distillate as indicated at 4 in the drawing. However, if there is a substantial portion of volatile oil in the distillate it may be separated from the water in any suitable manner, as by decantation or centrifugation, and if desired, it may be returned to the dehydrated citrus peel prior to any further subdivision in order to increase the flavor value of the peel. Since the amount of oil recovered will in any event be extremely small in proportion to the peel, the oil should be emulsified with corn syrup glycerol solution and a suitable emulsifier as shown by step 5 and then introduced to the dehydrated peel. The peel may then be cut to the final size and shape desired as indicated by numeral 6 on the drawing.

The product resulting from the foregoing treatment will be composed of not less than 10% corn syrup solids, not less than 22% glycerol, and will not contain more than 16% moisture. It will be of any particle size desired and may be used as an article of commerce as soft preserved peel in the preparation and flavoring of sherbets, ice cream, cakes marmalades, candy fillings, candied or glacéd peel and other products.

If desired, my product may be prepared in the form of a free-flowing dry preserved peel. This is accomplished simply by adding to the corn syrup solids-glycerol containing dehydrated peel sufficient starch or other tasteless water soluble polysaccharide powder coating agent, exemplified by the vegetable gums (locust bean, acacia and guar gum for example), soluble dextrine, pectin and carboxy methyl cellulose, to substantially coat the individual peel particles. In accordance with step 8, the treated peel and coating agent are mixed and classified until individual peel pieces are completely coated. It is preferred to use powdered pectin or a pregelatinized starch since those materials combine with glycerol to give a semitranslucent glycerite coating which accentuates the natural color of the peel. Furthermore, these materials combine with glycerol to form relatively solid coatings which further assist in preventing loss of volatile oil and deterioration of the product.

The resulting dry preserved peel may be used wherever my soft preserved peel is used and, in addition, provides, for the first time, a citrus peel suitable for flavoring prepared cake and cookie mixes, fruit cakes, pies, icings, and other products distributed by the baked goods industry. It may also be used as a grated product intended for condiment use in shaker top dispensers.

While I have disclosed a one-step dehydration impregnation process, I have also found it possible, and for some purposes desirable, to utilize a two-step process. Although this process has not been illustrated in the drawing, its practice should be readily understood when compared with the one-step process shown. Instead of initiating treatment with a glycerol-corn syrup solution, glycerol alone is used in the dehydration of the peel. Upon completion of moisture removal, excess glycerol is quickly drawn off while boiling under vacuum is continued. Since glycerol has a substantially lower viscosity than the glycerol-corn syrup solids solution utilized in the one-step process, moisture removal is greatly accelerated, thus reducing the time-temperature factor, so important in flavor deterioration.

Just as soon as the glycerol is removed, a warm corn syrup solids-glycerol solution is added, while the vacuum is maintained. If a vacuum is not utilized, the peel will collapse as a result of the moisture having been removed from the cellular pores. After sufficient corn syrup solids-glycerol solution has been introduced to completely cover the dehydrated peel, the vacuum is disrupted intermittently in order to impregnate the peel with the warm preserving solution.

In all other respects the process is similar to the one-step dehydration-impregnation method illustrated.

Reference to the following examples illustrates the simplicity and ease of preparation of my fibrous fruit product, as well as its characteristic of rehydratability to fresh form after long storage:

EXAMPLE 1

A quantity of 400 grams of raw ¼ inch size diced Valencia orange peel was added to 900 grams of a syrup consisting of 40% corn syrup solids and 60% glycerol at a temperature of 115° C. in a round bottom flask. The syrup temperature dropped to approximately 70° C. and with heating gradually increased to 95° C. after 12 minutes under a vacuum of 22 inches of mercury. Heating was discontinued and the vacuum was released several times to permit impregnation of the peel with corn syrup solids and glycerol and to produce a semitranslucent peel. The contents of the flask were cooled under a vacuum of 27 inches of mercury until the temperature dropped to 80° C. The syrup-peel mixture was then removed from the flask and passed through a coarse screen to separate excess syrup. A yield of 331 grams of soft preserved peel, having a composition of 30.8% corn syrup solids, 45.9% glycerol and 23.3% orange peel solids, was obtained. A quantity of 45 grams of pregelatinized cold water swelling starch was then thoroughly mixed with 165 grams of the soft preserved peel obtained above to yield 210 grams of dry preserved peel having a composition of 24.2% corn syrup solids, 36.1% glycerol, 21.4% pregelatinized starch and 18.3% original orange peel solids.

Both the soft preserved and the dry preserved peel of the foregoing example were stored at room temperature in a closed jar for a period of 6 months, at which time they were rehydrated by immersing in water. Both samples had a fresh peel color, a fresh peel flavor, and a fresh peel firmness. On the other hand, a sample of untreated peel taken from the same batch deteriorated to an inedible extent within two weeks under identical storage conditions. This sample was brown, soft and mushy and was covered with mold growths.

EXAMPLE 2

A pilot plant experimental run was performed on lemon flavedo shaved to a thickness of ⅛ inch using a 120 gallon steam jacketed vacuum reaction tank. A quantity of 41 pounds of the shaved peel was added in the tank to 269 pounds of a syrup composed of 60% by weight of U.S.P. glycerol and 40% by weight of corn syrup solids having a dextrose equivalent to 42. A vacuum was applied and heating was initiated and continued for approximately 30 minutes until the temperature rose to 200° F. The average vacuum during this period was 23.9 inches of mercury. The contents of the tank were momentarily subjected to atmospheric pressure on three different occasions after the temperature had risen to 200° F. in order to insure more complete impregnation of the peel with corn syrup solids and glycerol. The syrup and peel were removed from the tank and excess syrup removed from the dehydrated peel by draining and basket centrifugation. Pregelatinized starch was then tumbled with the peel to give 29 pounds of dry preserved lemon peel. The moisture content of the finished product was 5.0% and the lemon oil content by weight was 1.00%. The product when rehydrated had all of the characteristics of fresh lemon peel.

EXAMPLE 3

To prepare a dried preserved orange peel utilizing dextrose monohydrate, a quantity of 80 pounds of shaved Valencia orange peel was added to 500 pounds of a syrup having 40% glycerol, 20% corn syrup solids, and 40% dextrose monohydrate in a 120 gallon steam jacketed vacuum reaction tank at a temperature of 205° F. Hydrodistillation of the peel was carried on at a vacuum of 22 inches of mercury for a period of 33 minutes until the syrup-peel temperature rose to 204° F. The distilland was removed from the tank and the peel separated from the syrup by straining and centrifugation. To the resulting soft preserved peel was added a quantity of 12½ pounds of powdered corn starch prior to grinding the peel to the desired size in a hammer mill. An equal amount of corn starch was subsequently tumbled with the ground peel to produce 83 pounds of dry preserved Valencia orange peel. A portion of the corn starch was added prior to grinding to aid in the prevention of sticking of peel pieces and in order to absorb any orange oil released during grinding, thus preventing its loss in the mill. The moisture content of this product was 7¾% and the orange oil content was .88%. As was the case with my other products, this dry preserved peel reconstituted very readily to a fresh peel form and was in excellent condition after four months of storage at room temperature.

EXAMPLE 4

Utilizing the same equipment as for the last example, 75 pounds of a navel orange peel shaved to a ⅛ inch thickness was added to 500 pounds of syrup composed of 60% by weight of glycerol and 40% by weight of corn syrup solids having a 42 dextrose equivalent, at a temperature of 204° F. and hydro-distilled under a vacuum of 24 inches of mercury. The vacuum was interrupted on three separate occasions in order to cause greater impregnation of the peel with syrup. The distilland was then removed from the tank and the syrup separated from the peel by draining and centrifugation. The resulting soft preserved peel was mixed with 4 pounds of pregelatinized starch prior to grinding in a hammer mill using a plate with ⅜ inch openings. After grinding, a 7 pound further quantity of the starch was tumbled with the peel to give 66 pounds of dry preserved navel orange peel having a moisture content of 3½% and an orange oil content of .84%. This product similarly rehydrated to a desirable fresh peel form and continues to maintain its desirable characteristics after six months' storage.

EXAMPLE 5

The two-step dehydration-impregnation process is exemplified by the treatment of Winter Nelis pears previously diced to a ⅜ inch cube size. A quantity of 216 grams of these pear cubes was placed in a round bottom flask along with 337 grams of U.S.P. glycerol. A vacuum of 26½ inches of mercury was applied and the contents of the flask were heated for approximately 8 minutes until the temperature rose to 125° C. While maintaining the vacuum and before the contents of the flask had ceased boiling, the glycerol was drawn off from the flask and 302 grams of a warm 60% glycerol and 40% corn syrup solids solution was substituted. Heat was applied to obtain a temperature of 70° C. and thereafter the vacuum was interrupted several times in order to effect impregnation of the pear cubes with the corn syrup solids-glycerol solution. The excess solution was then withdrawn. The yield was 98 grams of a semitranslucent dehydrated pear product having a corn syrup solids content of 13.1%, a glycerol content of 65.5% and an original pear solids content of 21.4%. The total moisture content of the product was 6.4%. This soft preserved pear cube product remains readily rehydratable and flavorful after four months of storage at room temperature.

EXAMPLE 6

Fresh raw pineapple was prepared for processing by stripping its hull, coring and cubing to ⅜ inch size. An amount of 186 grams of the cubed pineapple was added to 558 grams of a 60% glycerol, 40% corn syrup solids solution in a round bottom flask and heat was applied thereto for 10½ minutes, under a vacuum of 28½ inches of mercury, until the temperature rose to 110° C. During the course of heating and shortly prior to its termination, the vacuum was disrupted intermittently in order to effect impregnation of the pineapple cubes. The dehydrated pineapple was then separated from excess solution over a coarse screen to yield 92 grams of a semitranslucent pineapple cube product having a corn syrup solids content of 30.5%, a glycerol content of 45.7% and an original pineapple solids content of 23.8%. The product treated as above had a moisture content of 8.8%. It is still of excellent taste and storability. Similar processing of pineapple cores, a by-product of the pineapple canning industry, has resulted in production of a semitranslucent, tasty, commercially acceptable flavoring product; thereby making it possible to upgrade a by-product of low value to one of considerable economic value.

EXAMPLE 7

Raw whole cranberries were treated in accordance with the two-step method by introducing 300 grams of the cranberries and 700 grams of U.S.P. glycerol into a round bottom flask and heating the flask under vacuum for 14 minutes until the temperature rose to 120° C. At this temperature the glycerol was removed under vacuum from the flask and a warm syrup of 60% glycerol-40% corn syrup was substituted. Heat was again applied to a temperature of 85° C. and the vacuum was interrupted 6 separate times to effect impregnation of the cranberries while under the surface of the solution. Finally, the excess warm glycerol-corn syrup solids solution was withdrawn to yield 151 grams of semitranslucent dehydrated cranberries, a corn syrup solids content of 13.7%, a glycerol content of 69% and an original cranberry solids content of 17.3%. Total moisture content of this product was 2.3%. As is the case with the products of the foregoing examples, the cranberries retained their flavor and prospective long storage life after six months' storage at room temperatures. In connection with the processing of cranberries in accordance with my invention, I have found that it is desirable to puncture or perforate the skins of the cranberries prior to treatment in order to avoid rupture of their outer skin. This treatment is not, however, necessary to production of a satisfactory cranberry product, since the cranberries retain their flavor and preservability irrespective of loss of shape.

EXAMPLE 8

A dehydrated coconut product was prepared by cubing fresh coconut meat to a ⅜ inch size and placing 165 grams of these cubes into a round bottom flask containing 450 grams of a 40% corn syrup solids-60% glycerol solution. A vacuum of 27½ inches of mercury was then utilized and heat was applied until the contents of the flask reached a temperature of 135° C. During the heating cycle the vacuum was interrupted several times in order to insure maximum impregnation of the coconut meat with corn syrup solids-glycerol solution. After drawing off all excess hot solution, 128 grams of dehydrated, impregnated, cubed coconut was obtained, which after four months of storage still retains its good flavor and storability.

EXAMPLE 9

Fresh green pippin apples were cored and cut to obtain 277 grams of ⅜ inch cubes. These were placed in a round bottom flask together with 500 grams of U.S.P. glycerol and heat was applied for 11½ minutes, under a vacuum of 27½ inches of mercury, until the temperature rose to 110° C. While continuing boiling under vacuum, the glycerol was withdrawn and a warm syrup of 60% glycerol and 40% corn syrup solids was introduced into the flask. The syrup-apple mixture was heated to 75° C. and shortly before conclusion of the vacuum hydro-distillation step, the vacuum was interrupted several times to effect impregnation. The warm glycerol-corn syrup solids syrup which was not utilized for impregnation was then removed by vacuum to yield 137 grams of a translucent dehydrated preserved apple product with a moisture content of 8.6%. The composition of the cubed product was 9.4% corn syrup solids, 67% glycerol and 23.6% original apple solids. This product retains its fresh flavor rehydratability and prospective long term storage life after retention at room temperature for more than 2 months.

EXAMPLE 10

Table I illustrates the effect of controlled flavedo pricking of lemon peel on the amount of impregnation (syrup uptake), degree of product translucency and flavor level. In each case the pricking was done by hand on the peel before it was cubed, by means of a florist's "frog," care being taken not to puncture into the albedo to avoid appreciable absorption of the oil into the albedo. The samples were each dehydrated and impregnated in the manner described in Example 2, the syrup comprising a mixture of 40% glycerol, 40% dextrose monohydrate and 20% corn syrup solids (percentages by weight).

on a wire screen to retain the peel pieces and allow the syrup to drain away.

In the case of the two-step process, the initial syrup used in the first step (dehydration) was drawn off through a glass tube with vacuum, leaving the dehydrated peel pieces behind in the flask. The syrup used for making various combinations of flavor and color was then drawn by vacuum into the flask with the peel. While heating the peel and syrup under vacuum in the manner indicated in the first step, the temperature was gradually brought up to a temperature preferably not exceeding 60° C. while "making and breaking" the vacuum ten times. In the examples given, this second step of the process required only five minutes. Although less vacuum "make and breaks" than ten may be used, this treatment is recommended to effect maximum impregnation of the peel pieces with flavor and color.

Finally, as in the one-step process, the syrup and dehydrated citrus albedo were separated on a wire screen and the excess hot syrup allowed to drain away from the pieces of citrus albedo.

*Table I.—Effect of controlled perforation on the characteristics of dehydrated lemon peel*

| Product | Pre-treatment— No. of Punctures per sq. Cm. | Wt. of Peel, grams | Ratio, Peel-Syrup | Processing Conditions | | Finished Dehydrated Product | | | |
|---|---|---|---|---|---|---|---|---|---|
| | | | | Temp., °C. | Time (min.) | Flavor | Translucency | Percent wt. increase | Percent Moisture |
| Cubed Lemon Peel | None | 35 | 1:6 | 95 | 25 | Most lemon flavor | Somewhat opaque. | 9.4 | 8.3 |
| Do | 15.2 | 35 | 1:6 | 95 | 25 | Some lemon flavor | Fair translucency. | 13.7 | 8.5 |
| Do | 38.0 | 35 | 1:6 | 95 | 25 | Slight lemon flavor. | Good translucency. | 20.6 | 7.8 |
| Do | None | 50 | 1:6 | 95 | 25 | Most lemon flavor | Somewhat opaque. | 9.8 | 7.6 |
| Do | 38.0 | 50 | 1:6 | 95 | 25 | Slight lemon flavor. | Good translucency. | 17.4 | 6.5 |
| Do | 60.8 | 50 | 1:6 | 95 | 25 | Very slight lemon flavor. | Excellent translucency. | 22.6 | 6.8 |

EXAMPLE 11

Tables II and III illustrate the present invention as applied to the treatment of citrus albedo to produce flavor carriers and various combinations of the carriers with colors and fruit and spice flavors. In each case the flavedo layer was removed from the whole fruit by hand with a potato peeler, followed by peeling off the remaining albedo and putting it through a potato dicer wherein it was cut into shapes approximating cubes, two dimensions of which were 8 mm., the third dimension depending upon the peel thickness. In the commercial preparation of these products, the shaving of the flavedo and the separation of the albedo from the fruit is done automatically, as with the machine disclosed in said Patent No. 2,212,066.

The albedo was placed in a 3 liter round bottom Pyrex flask along with the indicated peel-syrup ratio using a syrup consisting of 40% glycerol, 40% dextrose monohydrate and 20% corn syrup solids.

In each case the mixture was heated over a gas burner under vacuum conditions (about 22 inches' mercury).

When the temperature reached approximately 80° C., the vacuum was broken ten times, employing a vacuum "make and break" technique in order to effect maximum impregnation. Heating was then continued for a period of 15–25 minutes until the temperature rose to 90°–98° C. At this point the subsequent treatment differed depending upon whether the one-step or two-step process was to be used.

With the one-step process, the syrup and dehydrated peel were separated by placing the peel-syrup mixture In regard to the manner in which flavor and color is added to the citrus albedo, several methods can be used depending largely on the nature of the flavor and color. With fairly volatile flavors, such as most essential oils, it is preferred to mix the flavors in the syrup used for impregnating the peel in the second step of the two-step process as was done in many of the examples set forth in Table II. The same would be true of any colors which are susceptible to heat damage. Thus, the flavors and colors are not exposed to the higher temperatures and vacuum used in the dehydration step. Since oleoresin flavors are generally non-volatile, they can satisfactorily be used at any point in the process.

It will be understood that the present process contemplates dehydration of the citrus albedo as such, with the production of a non-flavored but preserved product. In such case the purchaser can add any desired flavor and/or color, preferably although not essentially, in the manner described herein as in the second step of the two-step process. Alternatively, the non-flavored product would be useful as nutritious filling material for food products.

In certain cases it is desirable to add the color to the citrus albedo as a pre-treatment step. Certain dye-stuffs give a greater tinctorial effect to the albedo from water solutions or glycerol rather than from the syrup. Examples of these variations in treatment are shown in Table II in the second section for lemon albedo "soaked in water containing dye." In all of the other examples shown in this table, except one, the color was added to the syrup used for impregnating the albedo in the second step of the two-step process. One example of a pre-treatment of the albedo with the dye in glycerol solution is given.

It will be noted that one example is grapefruit albedo impregnated with orange oil. Because of the natural bitterness of grapefruit albedo this type of product is useful as a substitute for the bitter Seville orange which is so desirable for marmalade manufacture.

However, in the case of my peel product, which was stored at room temperature and below for periods up to a year or more, no gross color changes were observed. Also surprising was the fact that when orange peel treated by my process was stored for 30 days at 120° F., and this peel used to bake muffins, many people preferred the flavor of the muffins made with the high-temperature-

*Table II.—Variously colored and flavored dehydrated citrus albedo*

| Type of Citrus (Albedo only) | Wt. of Albedo, grams | Pre-treatment of Peel[1] | Ratio, Peel/Syrup (by wt.) | Additives | | Max. Temp., °C. | Time for Processing, min. | | Percent wt. increase after final step | Percent moisture in finished product |
|---|---|---|---|---|---|---|---|---|---|---|
| | | | | Flavor[2] (parts by wt.) | Color (mg. dye/100 ml. Solution) | | 1st step | 2d step | | |
| Lemon | 50 | None | 1:6 | None | None | 92 | 21 | | 23.6 | 8.7 |
| Do | 50 | do | 1:6 | do | do | 92 | 21 | | 22.0 | 8.2 |
| Do | 150 | do | 1:6 | do | do | 95 | 25 | | 25.1 | 7.4 |
| Do | 50 | Soaked in water containing dye. | 1:6 | Cherry, D & O 16375, 1:400 syrup. | Erythrosine, 65 mg. | 90 | 15 | 5 | 56.6 | 7.0 |
| Do | 50 | do | 1:6 | Spearmint (Kohnstamm), 1:200 syrup. | FD & C Green No. 2, 24 mg. | 90 | 20 | 5 | 38.4 | 6.8 |
| Do | 50 | do | 1:8 | Raspberry, D & O 16351, 1:400 syrup. | Amaranth Red No. 2, 48 mg. | 98 | 20 | 5 | 32.2 | 5.9 |
| Do | 50 | do | 1:6 | Pineapple, D & O 16315, 1:400 syrup. | Sunset Yellow, 192 mg. | 95 | 20 | 5 | 68.8 | 5.3 |
| Orange | 50 | None | 1:8 | Cinnamon, D & O 512, 1:200 syrup. | Erythrosine, 65 mg. | 95 | 20 | 5 | 66.8 | 3.4 |
| Do | 50 | do | 1:8 | None | None | 95 | 20 | 5 | 33.8 | 4.8 |
| Do | 50 | do | 1:8 | Cold Pressed Grapefruit Oil, 1:20 syrup. | do | 95 | 20 | 5 | 18.4 | 5.2 |
| Do | 50 | do | 1:8 | Raspberry, D & O 16351, 1:400 syrup. | Amaranth Red No. 2, 42 mg. | 96 | 20 | 5 | 46.8 | 3.2 |
| Grapefruit | 50 | Soaked in Glycerol containing dye. | 1:8 | Cold Pressed Orange Oil, 1:20 syrup. | Sunset Yellow, 192 mg. | 98 | 20 | 5 | 86.8 | 2.6 |

[1] Adding color to the albedo in the pre-treatment step was accomplished by immersing the peel in the dye-containing-solution and alternately making and breaking the vacuum.
[2] "D & O" refers to Dodge and Olcott flavors.

Table III sets forth additional examples of the treatment of orange albedo. No pre-treatment was carried out in these examples, but both the one and two-step processes are included. In each of these examples the ratio of albedo to syrup was 1:6.

stored peel which had darkened, over the control sample.

This result is completely contrary to what would be expected for this type of product, where high temperature storage has always resulted in a deterioration of flavor acceptability.

*Table III*

| Type of Citrus (Albedo only) | Wt. of albedo, grams | Syrup used and Additives in syrup | | Additives | | Max. Temp. (° C.) | Vac. (in. of Hg) | Time for Processing (min.) | | Percent wt. increase after final step | Percent moisture of final product |
|---|---|---|---|---|---|---|---|---|---|---|---|
| | | 1st step | 2d step | Flavor (percent by wt.) | Color (mg. dye/100 ml. Solution) | | | 1st step | 2d step | | |
| Orange | 80 | Reg. syrup[1] plus flavor and color. | | 0.6% oleoresin ginger, D & O 521. | Sunset Yellow 46 mg. | 101 | 21 | 20 | | 38.4 | 3.5 |
| Do | 80 | Glycerol | Reg. syrup | | | 103 | 21 | 20 | 6 | 27.5 | 3.0 |
| Do | 80 | do | Reg. syrup plus flavor and color. | 0.6% oleoresin ginger, D & O 521. | Sunset Yellow, 46 mg. | 106 | 21 | 20 | 7 | 21.5 | 2.5 |
| Do | 80 | Glycerol and color. | Reg. syrup plus flavor. | 5% cold pressed grapefruit oil. | FD & C Green No. 2, 24 mg. | 105 | 20 | 20 | 5 | 34.0 | 4.0 |

[1] "Reg. syrup" was a mixture of 40% glycerol, 40% dextrose monohydrate and 20% corn syrup solids.

It will be apparent from the foregoing that I have discovered a fibrous fruit product having extensive new uses in the flavoring and preservation of various foods, one which may be shipped long distances economically without loss of flavor and color; and that I have discovered a process for preparing an extremely desirable firm fibrous fruit product which is simple and economical.

Unexpectedly, the product prepared by my process has a marked resistance to "browning" when stored at room temperature or below. It is well known that corn syrups (starch hydrolyzates) and various reducing sugars combine with nitrogenous compounds such as proteins and amino acids (found in citrus peel), to produce brown to black colored reaction products. These "Maillard-type" browning reactions, involving the carbonyl and amino groups, produce food products that are both unsightly and of deteriorated flavor.

I claim:

1. A fibrous fruit product comprising a firm fibrous fruit substance selected from the class consisting of citrus peel, pomes, pineapple, cranberries and coconuts impregnated with not less than 10% corn syrup solids, not less than 22% glycerol and having not more than 16% moisture said product being substantially free from crystalline components.

2. The product of claim 1 having a coating of a tasteless, water soluble polysaccharide powder.

3. The product of claim 1 in which the refractive index of said firm fibrous fruit substance is such as to render said product translucent.

4. A process for preparing a fibrous fruit product substantially free from crystalline components which comprises heating a syrup comprised of not less than 30% nor more than 85% by weight of glycerol and not less than 15% nor more than 40% by weight of corn syrup solids, adding a firm fibrous fruit substance selected from the class consisting of citrus peel, pomes, pineapple, cranberries and coconuts to said syrup to form a fruit-syrup mixture, reducing the water content of said mixture to 16% or less by subjecting said mixture to vacuum hydro-distillation and separating said fruit product from said syrup.

5. The process of claim 4 which includes the additional step of adding pregelatinized starch to said fruit product and mixing said fruit product and said starch.

6. The process of claim 5 which includes the additional step of breaking said vacuum at least once during said vacuum hydro-distillation step.

7. A process for preparing a fibrous fruit product substantially free from crystalline components which comprises adding not more than one part by weight of a firm, fibrous fruit substance selected from the class consisting of citrus peel, pomes, pineapple, cranberries, and coconuts to one part by weight of a syrup comprising at least 30% glycerol and 15% corn syrup solids to form a fruit-syrup mixture, reducing the water content of said mixture to 16% or less by subjecting it to vacuum hydro-distillation, subjecting said fruit-syrup mixture intermittently to atmospheric pressure during said vacuum hydro-distillation, separating said fruit product from said syrup, coating said fruit product by adding a tasteless, water soluble, polysaccharide powder coating agent thereto, and mixing said fruit product and said coating agent to produce a translucent, dry, oxidation protected firm, fibrous fruit product.

8. A citrus peel product substantially free from crystalline components comprising citrus peel impregnated with not less than 10% corn syrup solids, not less than 22% glycerol and having not more than 16% moisture.

9. The product of claim 8 having a coating of a tasteless, water soluble, polysaccharide powder.

10. The product of claim 8 in which the refractive index of said product is such as to render said product translucent.

11. A process for preparing a citrus peel product substantially free from crystalline components which comprises heating a syrup comprised of not less than 30% nor more than 85% by weight of glycerol and not less than 15% nor more than 40% by weight of corn syrup solids, adding citrus peel to said syrup to form a peel-syrup mixture, reducing the water content of said mixture to 16% or less by subjecting said mixture to vacuum hydro-distillation and separating said peel product from said syrup.

12. The process of claim 11 which includes the additional step of adding pregelatinized starch to said citrus peel product and mixing said peel product and said starch.

13. The process of claim 12 which includes the additional step of breaking said vacuum at least once during said vacuum hydro-distillation step.

14. A process for preparing a citrus peel product substantially free from crystalline components which comprises adding not more than one part by weight of citrus peel to one part by weight of a syrup comprising at least 30% glycerol and 15% corn syrup solids to form a peel-syrup mixture, reducing the water content of said mixture to 16% or less by subjecting it to vacuum hydro-distillation, subjecting said peel-syrup mixture intermittently to atmospheric pressure during said vacuum hydro-distillation, separating said peel product from said syrup, coating said peel product by adding a tasteless, water soluble, polysaccharide powder coating agent thereto, and mixing said fruit to produce a translucent, dry, oxidation protected citrus peel product.

15. A process for preparing a citrus peel product substantially free from crystalline components which comprises dehydrating citrus peel to a moisture content of not more than 16% in a glycerol-corn syrup solids solution by subjecting said solution to vacuum hydro-distillation, and separating said peel from said solution.

16. A process for preparing a citrus peel product substantially free from crystalline components which comprises dehydrating citrus peel to a moisture content of not more than 16% by immersion of said citrus peel in a glycerol containing solution and vacuum hydro-distillation thereof, impregnating said peel with corn syrup solids by immersion of said citrus peel in a corn syrup solids containing solution and subjecting said solution to heat and intermittent vacuum, and separating said peel from said glycerol containing solution and said corn syrup solids containing solution to produce a soft, oxidation protected, preserved, citrus peel product.

17. A process for preparing a citrus peel product substantially free from crystalline components which comprises adding citrus peel to a glycerol-corn syrup solids mixture in a peel-mixture ratio of at least 1:1, reducing the moisture content of said peel to not more than 16% by vacuum distilling the peel containing mixture and separating said peel from said mixture to produce a soft, oxidation protected, preserved citrus peel.

18. The process of claim 17 which includes the additional step of adding pregelatinized starch to said soft citrus peel product and mixing said peel and said starch.

19. The process of claim 18 which includes the additional step of breaking said vacuum at least once during said said vacuum distillation step.

20. A process for preparing a citrus peel product substantially free from crystalline components which comprises heating a syrup comprised of not more than 40% dextrose monohydrate, not more than 40% nor less than 15% corn syrup solids and not more than 85% nor less than 30% of a mixture comprised of glycerol and propylene glycol, the amount of said propylene glycol constituting not more than 20% of the total weight of the syrup, adding citrus peel to said syrup in a peel-syrup weight ratio of at least 1:1, dehydrating said peel to a moisture content by weight of not more than 16% by subjecting the peel containing syrup to vacuum hydro-distillation and separating said peel from said syrup to produce a soft, oxidation protected, preserved citrus pel product.

21. The process of claim 20 which includes the additional step of adding pregelatinized starch to said soft citrus peel product and mixing said peel and said starch.

22. The process of claim 20 which includes the additional step of breaking said vacuum at least once during said vacuum distillation step.

23. A process for preparing a citrus peel product substantially free from crystalline components which comprises heating a syrup comprised of not more than 40% dextrose monohydrate, not more than 40% nor less than 15% corn syrup solids and not more than 85% nor less than 30% glycerol, adding citrus peel to said syrup in a peel-syrup weight ratio of at least 1:1, dehydrating said peel to a moisture content by weight of not more than 16% by subjecting the peel containing syrup to vacuum hydro-distillation and separating said peel from said syrup to produce a soft, oxidation protected, preserved citrus peel product.

24. A process for preparing a fibrous fruit product substantially free from crystalline components adding not more than one part by weight of firm fibrous fruit substances selected from the class consisting of citrus peel, pomes, pineapple, cranberries and coconuts to one part by weight of glycerol to form a fruit-glycerol mixture, reducing the water content of said mixture to 16% or less by subjecting it to vacuum hydro-distillation, removing said glycerol, adding a corn syrup solids-glycerol solution to said fruit to form a fruit-corn syrup solids-glycerol mixture, subjecting said fruit-corn syrup solids-glycerol mixture to a vacuum, disrupting said vacuum intermittently and separating said fruit product from said corn syrup solids-glycerol solution.

25. The process of claim 24 which includes the additional step of adding a tasteless water soluble polysaccharide power coating agent to said fibrous fruit product and mixing said fruit product and said coating agent to produce a translucent, dry, oxidation protected, firm, fibrous fruit product.

26. The process of claim 4 wherein the fibrous fruit substance comprises citrus peel and including the step of puncturing the flavedo layer of the peel to remove at least a portion of the peel oil therefrom prior to the steps set forth in claim 4.

27. The process of claim 4 wherein the fibrous fruit substance comprises citrus peel and including the step of applying a plurality of pinpoint pricks to the flavedo layer of the peel to remove at least a portion of the peel oil therefrom prior to the steps set forth in claim 4.

28. The product of claim 8 wherein at least some portion of the peel oil has been removed from the flavedo layer of the peel.

29. The process of claim 4 wherein the fibrous fruit substance consists of the albedo of the citrus peel.

30. The process of claim 4 wherein the fibrous fruit substance consists of the albedo of the citrus peel and wherein a natural food flavor is added to the syrup.

31. The process of claim 4 wherein the fibrous fruit substance consists of the albedo of the citrus peel and wherein a natural food flavor and a color is added to the syrup.

32. The process of claim 4 wherein the fibrous fruit substance consists of the albedo of the citrus peel colored with an edible coloring material.

33. The process of claim 24 wherein the fibrous fluit substance consists of the albedo of the citrus peel.

34. The process of claim 24 wherein the fibrous fruit substance consists of the albedo of the citrus peel and wherein a natural food flavor is added to the corn syrup solids-glycerol solution.

35. The product of claim 8 wherein the citrus peel consists of the albedo thereof.

36. The product of claim 8 wherein the citrus peel consists of the albedo thereof and wherein said product includes a natural food flavor.

37. The product of claim 8 wherein the citrus peel consists of the albedo thereof and wherein said product includes a natural food flavor and an edible coloring material.

References Cited in the file of this patent

UNITED STATES PATENTS

| | | |
|---|---|---|
| 220,359 | Dunham | Oct. 7, 1879 |
| 1,382,038 | White | June 21, 1921 |
| 2,328,554 | Heyman | Sept. 7, 1943 |
| 2,338,184 | Kaufman | Jan. 4, 1944 |
| 2,556,579 | Forkner | June 12, 1951 |
| 2,611,708 | Owens et al. | Sept. 23, 1952 |
| 2,622,033 | Fusco | Dec. 16, 1952 |
| 2,665,992 | Naps | Jan. 12, 1954 |